Dec. 5, 1950     O. A. CLARK ET AL     2,532,996
HINGE STRUCTURE FOR SPRAYING ATTACHMENTS
Filed April 5, 1948

INVENTORS.
Otho A. Clark
Ocie D. Hughes
BY
ATTORNEY.

Patented Dec. 5, 1950

2,532,996

UNITED STATES PATENT OFFICE 2,532,996

HINGE STRUCTURE FOR SPRAYING ATTACHMENTS

Otho A. Clark and Ocie D. Hughes, Atherton, Mo.

Application April 5, 1948, Serial No. 18,968

2 Claims. (Cl. 16—183)

This invention relates broadly to farm implements and equipment for use therewith and more particularly, to a spraying attachment adaptable for mounting upon a tractor or the like mobile structure, the primary object being to provide a spraying assembly that is highly adjustable, not only from the standpoint of distance above the ground at which spraying takes place, but with respect to the combined area that may be sprayed on each side of the tractor to which the assembly is attached.

It is now common knowledge that the recent developments of chemicals suitable for killing weeds and other undesirable elements has, also, brought forth the need for satisfactory equipment for applying such chemicals over large areas in a minimum amount of time and with little effort.

Spraying attachments for tractors, wagons and other implements have heretofore been developed, but for the most part, the same have been expensive, complicated and not easily operated. It is the most important object of this invention, therefore, to provide a spraying attachment for tractors having an elongated sectional conduit provided with spaced-apart nozzles or spraying heads, the sections whereof are relatively foldable into a position where the same will utilize only a small amount of space when it becomes necessary to travel through relatively narrow spaces.

Another important object of this invention is the provision of a spraying attachment of the above-mentioned character wherein the sections of the elongated conduit, extending outwardly and laterally from the tractor, are mounted for swinging movement on a horizontal axis, said sections having means for adjustably holding the same at any predetermined angle relative to the horizontal. A further object of this invention is the provision of hinge structure of the kind above identified, wherein such swingable sections of the conduit are, also, freely swingable on a vertical axis to the end that breakage will not occur in the event of accidental contact with heavy brush, posts or the like.

Other objects of this invention include the manner in which the entire spray head assembly is mounted for vertical adjustment; the way in which the sections thereof are interconnected by flexible tubes; and the manner in which the entire assembly is braced and supported to present a strong, yet simple and inexpensively manufactured attachment.

Other objects will be made clear or become apparent during the course of the following specification, reference being had to the accompanying drawing, wherein—

For purposes of illustration, the spraying attachment, forming the subject matter of this invention, has been shown as mounted upon a tractor broadly designated by the numeral 10. A pair of substantially parallel arms 12, affixed to the tractor 10 in any suitable manner, extend forwardly therefrom and have welded or otherwise affixed to their outermost ends a pair of vertical tracks 14.

Figure 5:
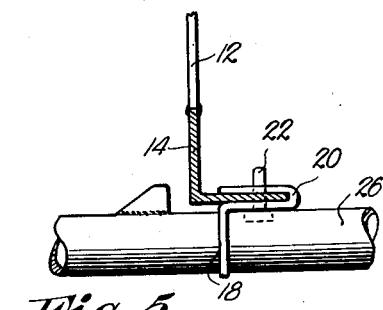

These vertically disposed tracks 14 are L-shaped in cross section, as clearly indicated in Fig. 5, each having a plurality of openings 16 formed in one leg thereof.

An L-shaped bracket 18, having one of its legs 20 rebent upon itself to present a U-shaped element in cross section as shown in Fig. 5, receives the leg of members 14 having openings 16 therein.

There are two of these members 18, each being slidably mounted on a respective upright member 14, and a leg 20 thereof is provided with aligned opening for receiving a pin 22 that in turn passes through one of the openings 16.

An elongated conduit, broadly designated by the numeral 24, includes a plurality of sections, there being a central section 26 illustrated and a pair of end sections 28. The central section 26 of the conduit 24 is secured directly to the lowermost end of the members 18 by welding or other suitable means for attachment.

Figure 1:
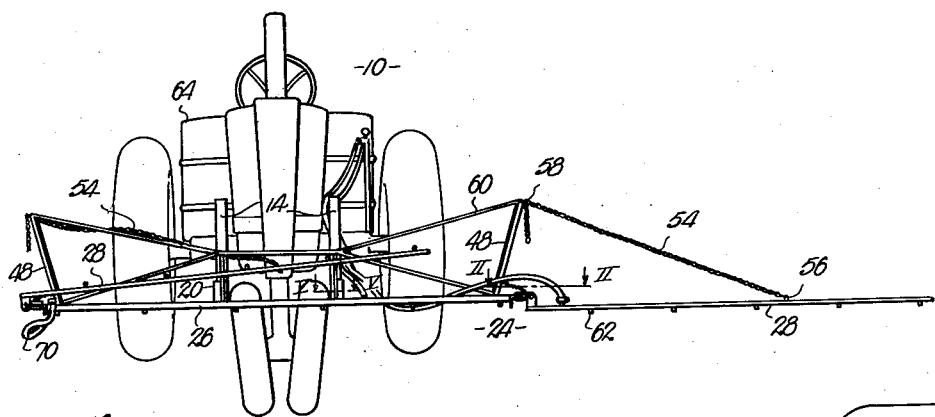
Fig. 1 is a front elevational view of a spraying attachment, made in accordance with the present invention, showing the same mounted upon a tractor with one of its sections extended and one in the folded condition.
Figure 4:
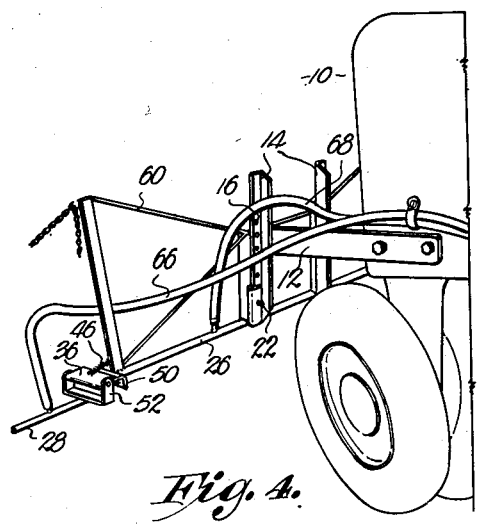
Fig. 4 is a fragmentary rear perspective view thereof and Fig. 5 is an enlarged fragmentary cross sectional view taken on line V—V of Fig. 1.

As illustrated in Figs. 1 and 4, this conduit 24 extends across the front of the tractor on a line substantially perpendicular to the longitudinal axis of tractor 10.

The central section 26 of the conduit 24 extends a distance to each side of the tractor 10. In other words, this section 26 is slightly longer than the width of the tractor 10. Each of the end sections 28 of the conduit 24 is hingedly secured to proximal outermost ends of the central section 26 by hinge structure shown in detail by Figs. 2 and 3 of the drawing. This hinge structure, broadly designated by the numeral 30, includes a plate 32 welded to the section 26 as at 34 and an element 36.

Figure 3:
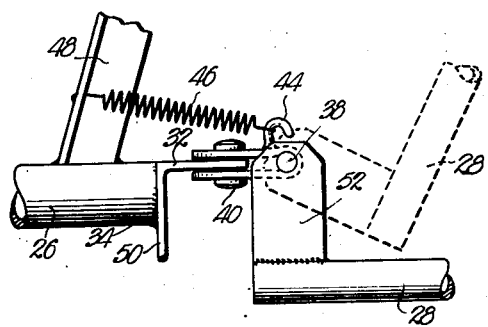
Fig. 3 is an enlarged fragmentary side elevational view showing such hinge structure.

As shown in Fig. 3, this element 36 is U-shaped in cross section and has a horizontal pin 38 mounted therein adjacent its bight. The element 36 received the plate 32 in overlapping relationship thereto and is provided with a pair of spaced-apart pins 40, the legs thereof are normally disposed within a pair of spaced notches 42 formed in the plate 32.

A hook 44, extending upwardly from the uppermost face of the bearing 38, receives one end of a spring 46. This spring 46 has its opposite ends secured to an upstanding arm 48, secured directly to the section 26 or conduit 24 inwardly from the outermost free end thereof.

Incidentally, the plate 32 has a downturned flange 50 secured directly to the outermost end of section 26.

A U-shaped bracket 52 straddles the element 36 and is pivotally secured directly to the outermost ends of the hinge pin 38 within the element 36. The corresponding end section 28 of conduit 24 is secured directly to this bracket 52 by welding or the like directly to bracket 52 adjacent to its bight.

It is clear from the foregoing that the sections 28 are freely swingable on a horizontal axis defined by the hinge pin 38 by reason of the bracket 52 being mounted upon such pin 38.

If desired, bracket 52 could be made rigid to pin 38, the latter being freely rotatable in element 36.

Figure 2:
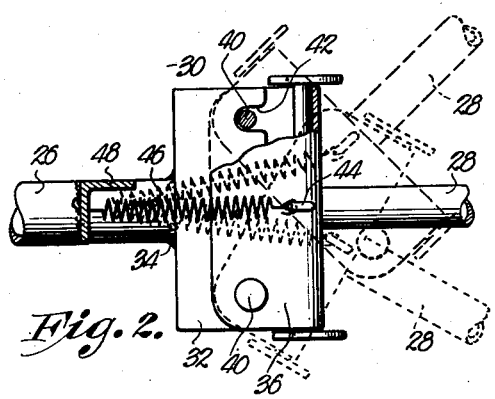
Fig. 2 is an enlarged fragmentary top plane view of the hinge structure per se taken on line II—II of Fig. 1.

It is, also, readily apparent that the sections 28 are freely swingable in a horizontal plane in the manner illustrated by dotted lines and by detached lines in Fig. 2 of the drawing. When the sections 28 swing in one direction in such horizontal plane, one of the pins serves as a pivotal point and rotates within its respective notch 42. When the section 28 swings in the opposite direction, the other pin 40 serves as a pivotal point.

The spring 46 permits such swinging movement and yieldably holds the sections 28 in a normal position with both pins 40 within their notches 42 and with the sections 28 extending outwardly in alignment with the central section 26.

Fig. 3 of the drawing illustrates the way in which the sections 28 are swingable on a horizontal axis, a chain 54 serving to hold the sections 28 at any desired angle. This chain 54 is joined to the section 28 intermediate its ends as at 56 and joins with the uppermost end of the respective arm 48 by having one of its links looped over a hook 58 on such arm 48.

Virtually all of the weight of the sections 28 is supported by the arms 48 and these arms 48 are interconnected by cross bracing 60 that is, also, secured to the brackets 18 in any suitable manner.

Each of the sections 26 and 28 of the conduit 24 is provided with a plurality of spray heads or nozzles 62 of conventional character and spaced along throughout the length of conduit 24. The liquid chemical to be sprayed is contained in barrels 64 mounted upon supporting structure (not shown) at the rear of the tractor; and any pump obtainable upon the open market may be used for creating pressure and forcing such liquid into the conduit 24. These barrels 64 are joined to the conduit 24 by a pair of flexible tubes 66 and 68. The tube 66 joins with one of the sections 28, while the tube 68 is connected directly to the central section 26 of conduit 24.

The other outermost section 28 is connected by means of a flexible tube 70 directly to the central section 26. Any suitable, easily-detachable means may be provided for joining the tubes 66 and 68, as well as the tube 70, to the conduit 24 that the operator may wish to use can be placed in operation.

Along the same line, it may be desirable to insert common shut-off valve in either the conduit 24 or the tubes 66, 68 and 70.

It is clear from the foregoing that a spraying attachment has been provided that is highly adjustable and is further desirable because of its unlikelihood of becoming damaged when placed in use. When the operator is traveling to a point of use, both of the sections 28 may be easily and readably folded in the manner illustrated in Fig. 1 to a condition where travel is not hindered by relatively narrow openings.

When a large field is to be sprayed, both of the sections 28 may be extended or either of such sections 28 used with the central section 26. Actually, any one or any combination of the three sections of conduit 24 can be used as conditions prescribe.

In the event the operator moves through relatively rigid weeds, brush or accidentally hits a fence post, tree or the like, the sections 28 will easily give away against the action of the spring 46 and then return to the normal operating position after such obstruction has been passed.

The height of the weeds or other undesirable growth will determine the height of conduit 24 and may be adjusted by means of the pins 22 and openings 16 in the upright supports 14.

Furthermore, in many cases, it may be desirable to dispose the sections 28 at an angle to the horizontal. One instance is for spraying along fence rows where the sections 28 must clear the top of the fence and, in this case, the length of chain 54 between arm 48 and section 28 may be shortened.

Another important advantage of the novel hinge structure detailed in Figs. 2 and 3 of the drawing lies in the easy removability of the sections 28 from the section 26 of conduit 24. An outward pull upon the sections 28 against the action of spring 48 will readily disengage the pins 40 from their respective notches 42, whereupon the spring 46 may be disconnected from hook 44 and the chain 54 removed from hook 58.

Furthermore, the entire assembly may be mounted either at the front or at the rear of a tractor or other mobile support, a feature not present in other structures of this character.

The simple, inexpensive, yet sturdy, assembly herein described may be easily modified and changed, particularly with respect to details of construction without varying from the spirit of this invention as defined by the scope of appended claims.

Having thus described our invention, what we claim as new and desire to secure by Letters Patent is:

1. A hinge comprising a plate having a pair of spaced notches formed in one edge thereof; a U-shaped member having a bight and a pair of spaced legs, said plate having a portion thereof adjacent said edge disposed between said legs for slidable engagement therewith; a pin normally within each notch respectively and interconnecting said legs; a spring attached at one end thereof to said member adjacent said bight and extending over the plate, said spring being adapted for rigid securement at its opposite end; and an article-receiving hinge pin disposed between said legs of the member adjacent said bight thereof for rotative movement on an axis perpendicular to said pins.

2. A hinge comprising a plate having a pair of spaced notches formed in one edge thereof; a U-shaped member having a bight and a pair of spaced legs, said plate having a portion thereof adjacent said edge disposed between said legs for slidable engagement therewith; a pin normally within each notch respectively and interconnecting said legs; a spring attached at one end thereof to said member adjacent said bight and extending over the plate, said spring being adapted for rigid securement at its opposite end; a hinge pin disposed between said legs of the member adjacent said bight thereof for rotative movement on an axis perpendicular to said pins; and a U-shaped bracket embracing said member and having one leg thereof joined to each end respectively of said hinge pin adjacent the free ends of the legs of the bracket.

OTHO A. CLARK.
OCIE D. HUGHES.

REFERENCES CITED

The following references are of record in the file of this patent:

UNITED STATES PATENTS

| Number | Name | Date |
|---|---|---|
| 691,551 | Kincaid | Jan. 21, 1902 |
| 926,791 | Watson | July 6, 1909 |
| 999,676 | Schoelles | Aug. 1, 1911 |
| 1,331,836 | Wilbanks | Feb. 24, 1920 |
| 1,943,655 | Cummings | Jan. 16, 1934 |
| 2,117,148 | Clark | May 10, 1938 |
| 2,169,948 | Gallupe | Aug. 15, 1939 |